Sept. 9, 1930.                L. L. KAHN                1,775,593
                    TURBINE WHEEL PROPELLER OR MOTOR
                    Filed July 27, 1925        5 Sheets-Sheet 2
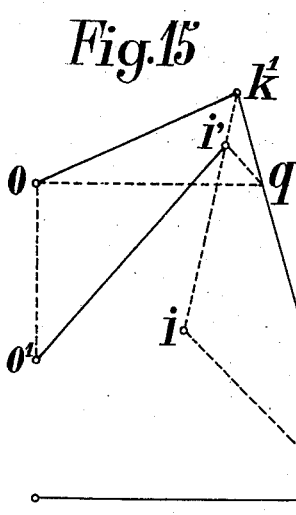
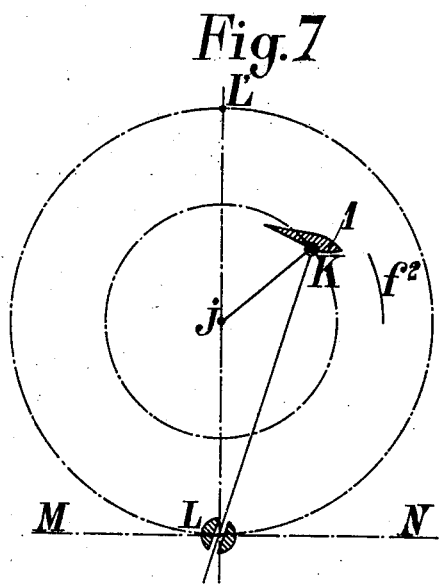
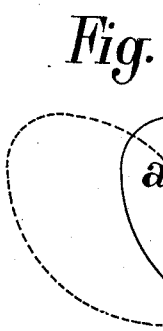
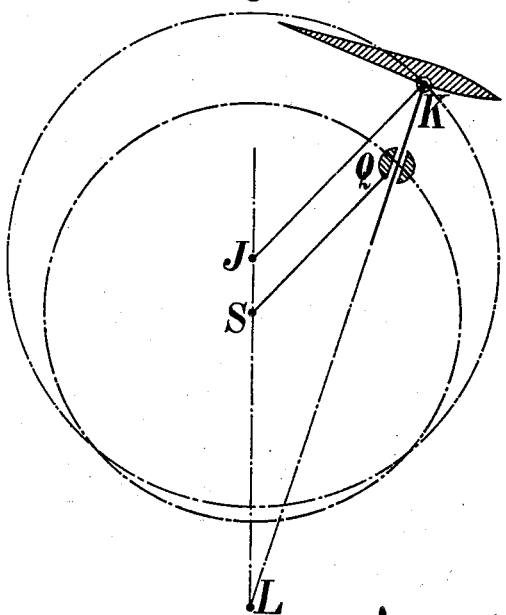

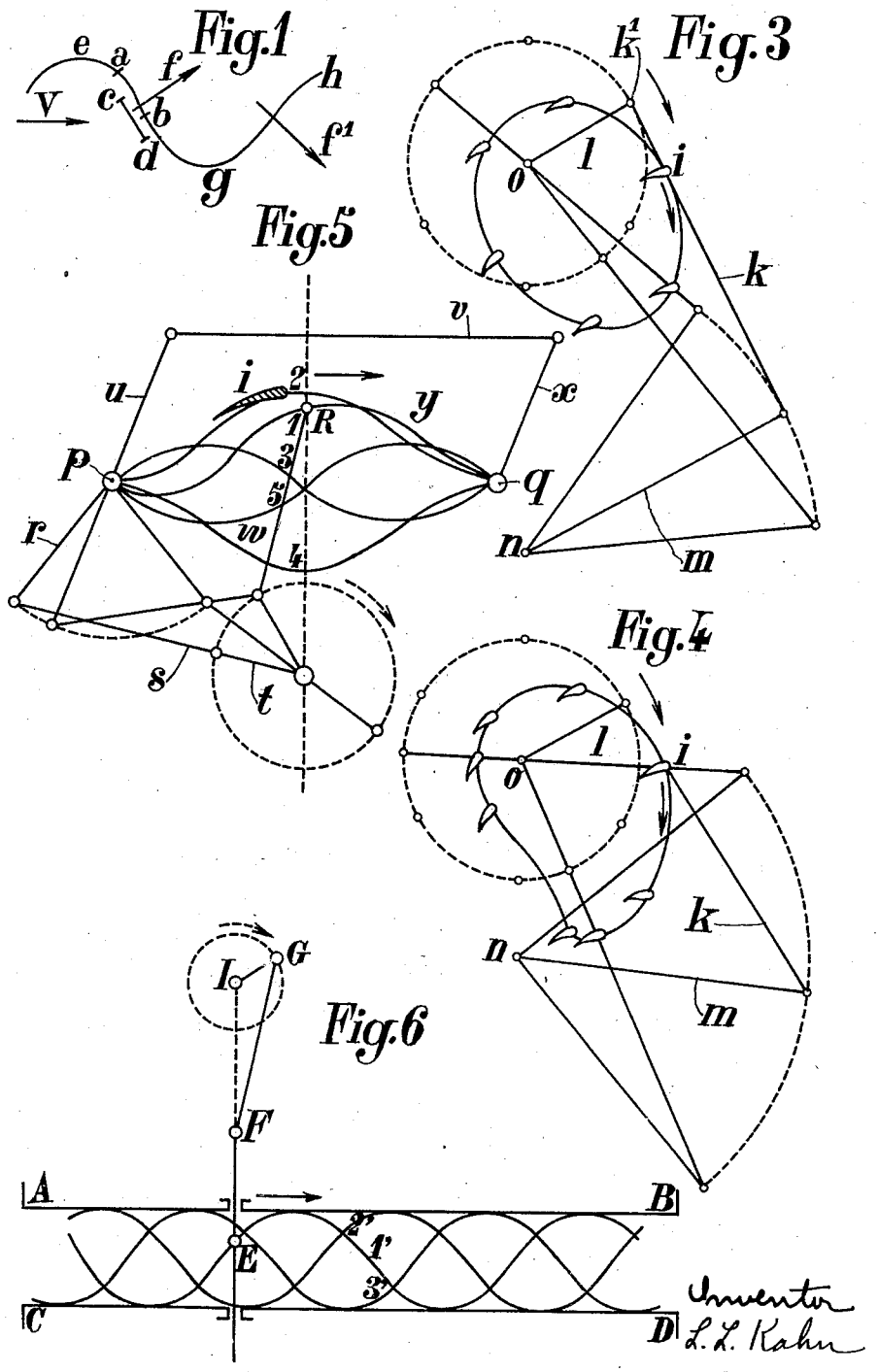

Sept. 9, 1930.    L. L. KAHN    1,775,593
TURBINE WHEEL PROPELLER OR MOTOR
Filed July 27, 1925    5 Sheets-Sheet 3
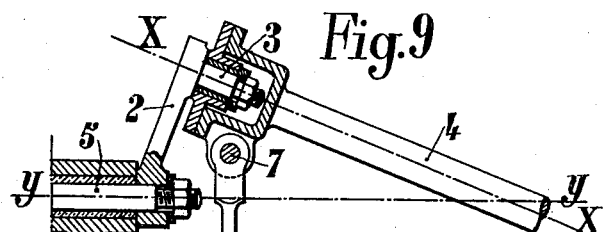
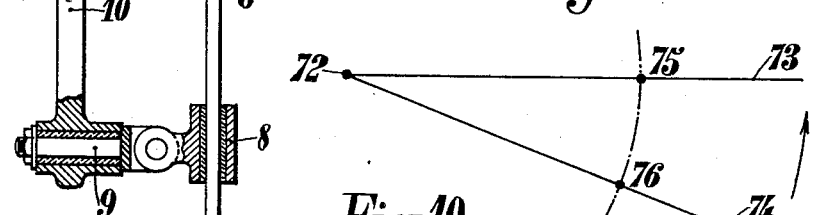
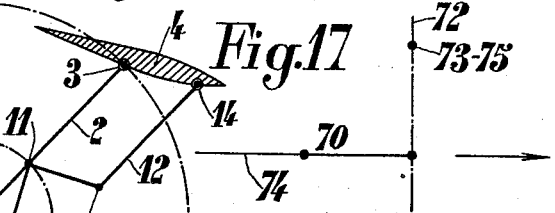
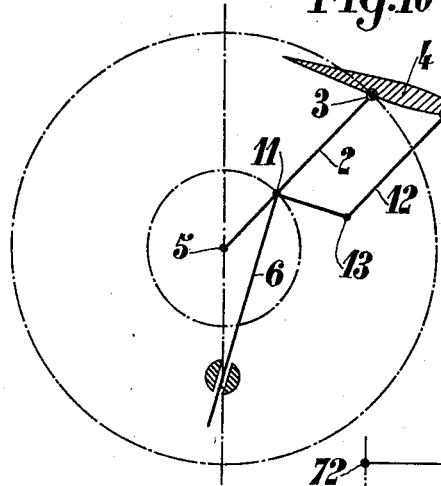
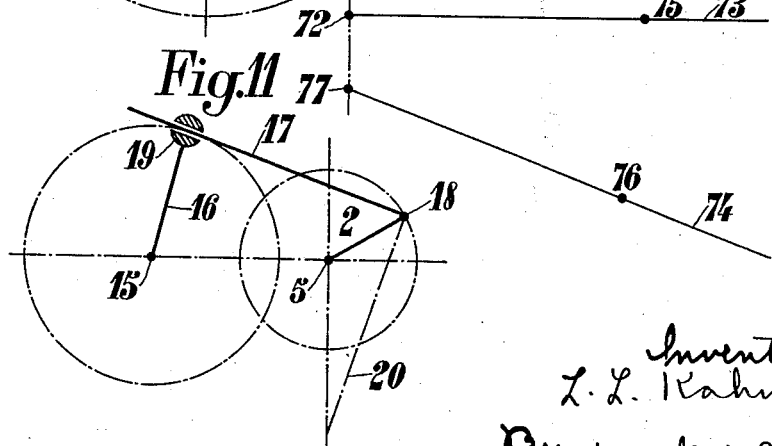

Sept. 9, 1930. L. L. KAHN 1,775,593
TURBINE WHEEL PROPELLER OR MOTOR
Filed July 27, 1925 5 Sheets-Sheet 4

Sept. 9, 1930. L. L. KAHN 1,775,593
TURBINE WHEEL PROPELLER OR MOTOR
Filed July 27, 1925 5 Sheets-Sheet 5
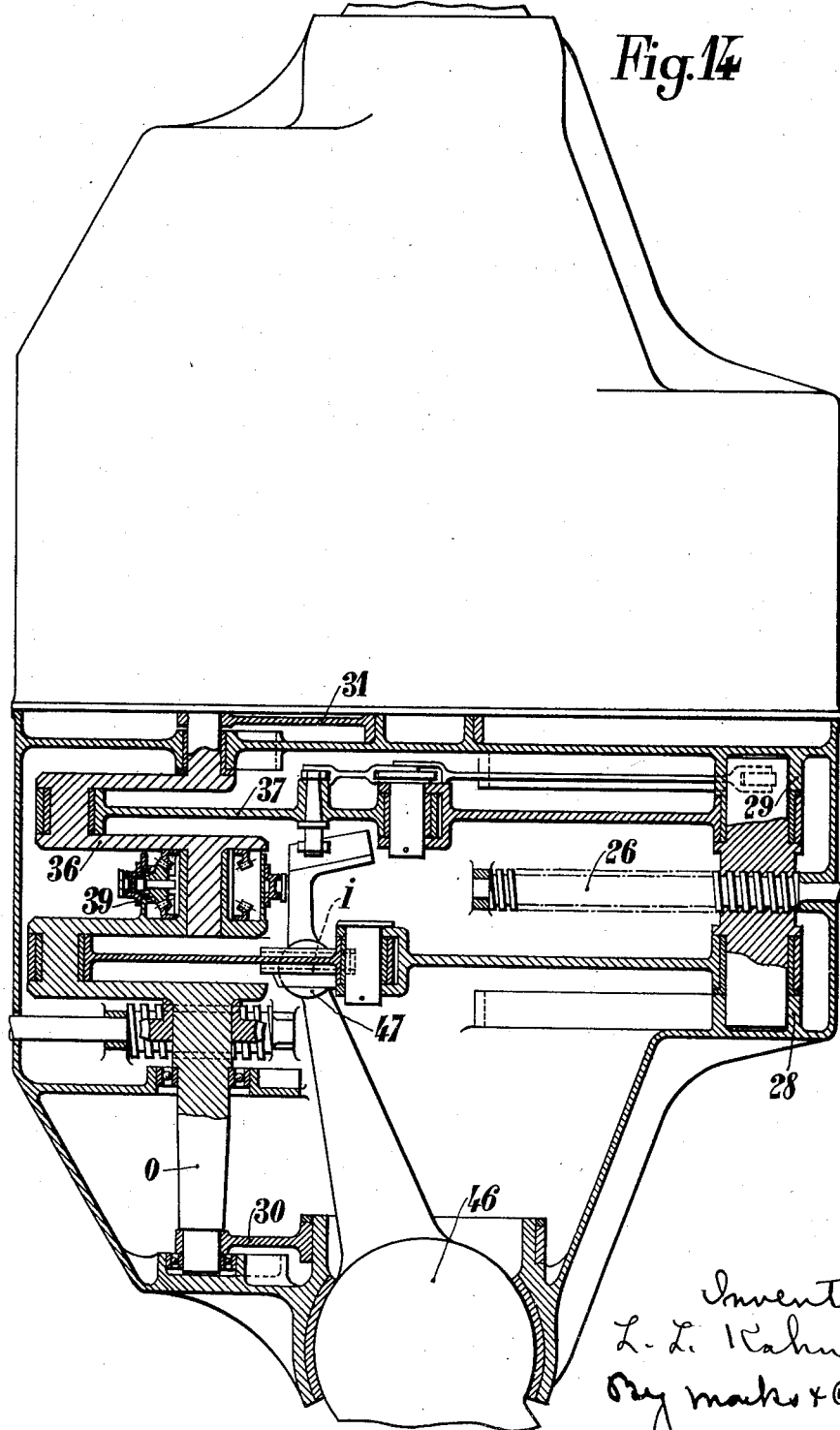

Patented Sept. 9, 1930

1,775,593

UNITED STATES PATENT OFFICE

LOUIS LAZARE KAHN, OF PARIS, FRANCE

TURBINE-WHEEL PROPELLER OR MOTOR

Application filed July 27, 1925, Serial No. 46,507, and in France August 2, 1924.

My invention has for its object a turbine wheel which serves either as a propeller for a vehicle moving in a fluid, or as a motor which is actuated by a fluid in motion.

This invention has for object certain means by which the action of the wheel may be varied in such a way that the incidence of the propulsive or driving surfaces of the wheel on their positive trajectory in the fluid, and relatively to this fluid, always remains correct, which is not the case in the arrangements heretofore employed.

In a general way, the invention is based on the fact, proved by reason and known by experience, that to all modification of very variable conditions in the use of a turbine wheel as a porpeller, or as a motor, there must be a corresponding complete modification of its method of action, that is to say a simultaneous modification on the one hand of the general orientation of its relative movement, and on the other hand of the form of this movement, and finally of the law of orientation of the propulsive surfaces at each instant, these modifications being suitably arranged in such order that the incidence of the propulsive surfaces on their positive trajectory relatively to the air always remains correct.

To my knowledge no turbine wheel has up to the present been proposed which fulfills these conditions; that is to say, if a turbine wheel has fulfilled, for a given period, the condition of correct incidence of the propulsive or driving surfaces on their positive trajectory in the air, this condition was not fulfilled for any different period.

Therefore, in order to vary the action of a propeller as heretofore proposed either the propeller must be inclined (and for example the axis of the screw) or the law of orientation of the blades must be modified (for example in the case of wheels having orientation blades). But reason and experience have shown that a screw inclined and driven by connection with the fluid makes but poor attack on the air in movement, for, in certain parts of its course, it exercises a restraint in place of effecting a tractive effect. In the same way, when one supporting bladed wheel turns on a fixed point so as to give a vertical result, it is seen that, owing to the angles of incidence which it is necessary to employ, the aerodynamic resultant is greatly inclined on the vertical in the majority of cases.

Turbine wheels are already known in which at least two homologous points of a propulsive element are compelled to describe two identical periodical movements, the two points not being at the same phase of their movement, and their trajectories not being mingled, but capable of being placed in coincidence by translation; under these conditions the propulsive effort is of the same direction as this translation, and this effort takes place in the direction from the point which is behind-hand in phase towards the point which is in advance of phase.

The invention consists then, in a general manner, in a turbine wheel agreeing to the definition set forth just above, in combination with the means for displacing by translation one of the trajectories of the two points set forth which describe periodical identical movements and is displaced in phase parallelly to the plane of the trajectory of the other point, and perpendicularly to the forward direction of the propulsion.

I desire that it may be clearly understood that I do not claim the combination, with a propeller agreeing to the preceding definition, of means for the displacement relatively by translation of the trajectories of the points of the propulsive elements displaced in phase perpendicularly to the planes of these trajectories. This arrangement is in effect well-known, for example in screws having variable pitches where the displacing of the phase is in general modified at the same time as the translation is effected.

The accompanying drawings illustrate, by way of example, several forms of carrying out the invention.

Fig. 1 is an explanatory diagram.

Figs. 2 to 8 show, by way of example only, diagrams of forms of construction.

Figure 13:
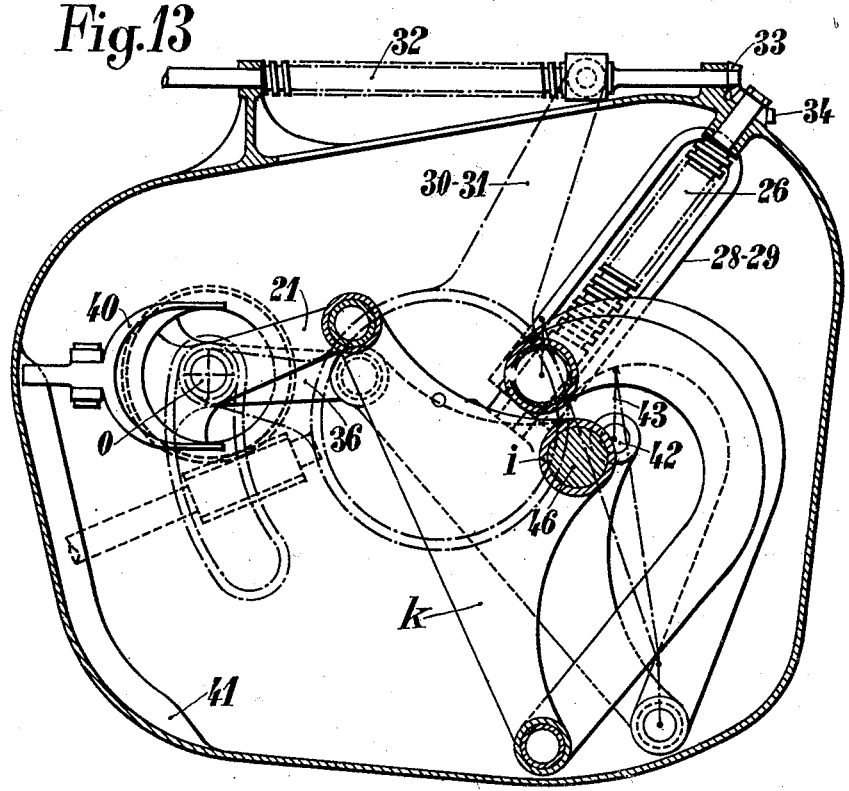
Figure 12:
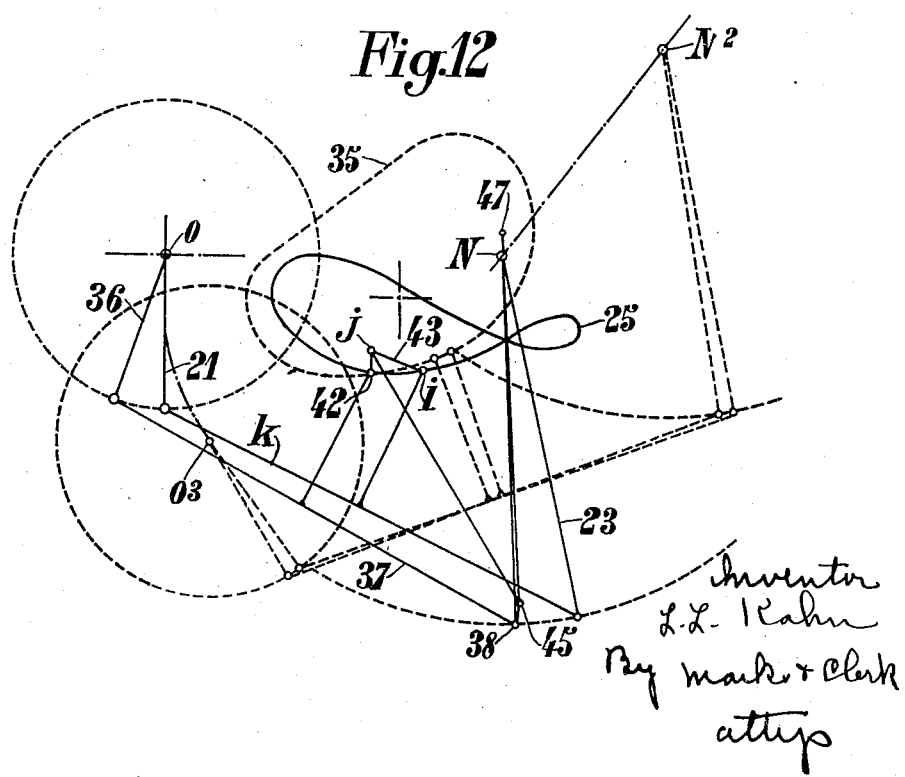

Figs. 9 to 14 illustrate the form of construction diagrammatically indicated in Fig. 8; Fig. 9 being a perspective view showing the principal members; Fig. 10 a sectional elevation; Fig. 11 a plan with the lower part in section; Fig. 12 a section of a constructional detail; Fig. 13 an elevation of parts shown in Fig. 12; and Fig. 14 a sectional perspective view of one of the parts shown in Figs. 12 and 13.

Figs. 15 to 18 are diagrams of other forms of construction.

In order that the invention may be well understood from the following description, it seems that there must first be given a justification of the general definition of the propeller previously indicated. It will then be easier to understand the manner in which the arrangement according to this invention ensures the correction, in all cases, of the incidence of the propulsive surface on its positive trajectory in the air.

If a surface element immersed in a fluid has distortion movements such that at every instant it takes the shape it would have by describing a sinuous surface in a determined direction, this element is subjected on the part of the fluid to a thrust directed in the fictitious direction of the path of movement and it exerts on the fluid a pressure in the opposite direction.

Suppose, for instance, an element $a\,b$ having a cylindrical surface (Fig. 1) the generatrices of which are at right angles to the plane of the figure, this element being represented by its directrix. The fluid will be supposed as being at rest relatively to the plane on the figure.

It will be supposed that the element $a\,b$ has imparted to it a movement which results from the combination of the four following movements:—

1. A driving movement having a speed V.
2. A transverse movement such that owing to its composition with the preceding one, the point $a$ describes the wavy curve $e\,g\,h$.
3. A movement of rotation such that at every instant the direction of $a\,b$ at the point $a$ is that of the tangent to the curve $e\,g\,h$ at this point.
4. A movement of distortion such that the element $a\,b$ applies at all its points on the surface $e\,g\,h$.

In these conditions, the action of the fluid upon the element is reduced to the frictional resistance.

It will now be supposed that the movement 2, 3, and 4 subsist, but that for the driving movement having a speed V is substituted a driving movement having a speed W it being assumed, for simplification, that V and W have the same direction; it will be also assumed that the action of the fluid on the element increases with the resulting speed and with the incidence, and that it is opposed to the engaged face.

In these conditions, the reaction of the fluid is directed in the direction $f$ when the element $a\,b$ is in the region $e\,g$ of the curve; it has a direction $f^1$ when the element is in the region $g\,h$. Its mean value will be directed in the direction V; it will increase with the incidence, that is to say with the difference V—W. It will depend on the shape or form of the curve $e\,g\,h$.

The action of the element upon the fluid will be directed in reverse direction.

An element constrained to this law of displacement will therefore be able to be used as a propeller.

It will now be assumed that the wing surface element $a\,b$ is carried by a frame which participates to the driving movement V, V being greater than W. It will be seen that, relatively to the fluid, the point $a$ and the point $b$ follow the same curve $e\,g\,h$, the point $a$ behind the point $b$ but relatively to the frame, $a$ and $b$ describe equal orbital curves, but the orbital curve of $a$ is at the rear of the orbital curve of $b$ according to a distance equal to the distance travelled over in the direction of the entrainment V during the time taken by $a$ in order to reach the point where it finds itself substituted for $b$ on the curve $e\,g\,h$.

Besides, the point $b$ is not at the same phase of its orbital movement, relatively to the frame, as the point $a$. The point $b$ which is in front of the point $a$ in the driving direction V. is also in advance of phase relatively to the point $b$.

Consequently, if two homologous points $a$ and $b$ of a propelling element to be described are constrained, relatively to the frame supporting this element, to two identical periodical movements, the two points $a$ and $b$ not being at the same phase of their movement and their trajectories not being mingled but separated one from the other by translation, a propelling stress is created which is of the same direction as this translation and in the direction from the point which is behind-hand in phase towards the point which is in advance of phase.

In Fig. 2 there is illustrated, in dotted lines, an orbital trajectory for the point $a$, and, in plain lines, an identical orbital trajectory, separated by translation from the former, for the point $b$. On this second trajectory there is shown at $a^1$ the geometric homologous point of $a$. The vector $aa^1$ is proportionate to the displacement V in the fluid and directed in the same way.

According to the present invention, one of the two trajectories may be displaced relatively to the other in a plane parallel to the plane of this latter and perpendicularly to the preceding direction of the propulsion, that is to say, perpendicularly to $a$—$a^1$, in such a manner that the direction of the propulsion becomes modified; in such a way as that already indicated and as hereinafter described, the permanent correction of the incidence of the propulsive element $a$—$b$ on its positive trajectory in the fluid $e\,g\,h$ is ensured.

According to the kind of application aimed at, a resultant must be sought which, instead of being directed in the direction of W, that is to say in the direction of the general displacement of the apparatus, will form with W any angle.

This can be realized in several ways:—

(a) Either with an element $a\,b$ the displacement of which in the direction $a\,b$ gives a transverse component; for instance, for producing supporting effects, $a\,b$ will be given the shape of a wing profile used in aviation; what has been said for the element $a\,b$ then applies to the chord of the wing;

(b) Or by causing $a\,b$ to rotate according to a constant angle during the entire movement, so that the engaging angle of $a\,b$ on its trajectory should be increased by a constant quantity;

(c) Or by modifying the curve $e\,g\,h$, so that the stresses during the period $e\,g$ and the period $g\,h$ should not have equal and opposed transverse components;

(d) Or finally by the combination of these means.

In fact, for applying the above-mentioned principle, it is necessary that the connections between the engine and the propelling elements should constrain the latter to describe combinations of the movements 2—3—4 conceived as it has been just mentioned. The propulsion will then take place at such a speed that there is equality between the driving stress and the resisting stress.

All these different movements can be realized either with distortable surfaces, or with rigid elements the trajectory and orientation of which are controlled by kinematic systems of current use in machines. The utilization of cams and the utilization of articulated systems are also possible.

It may be stated that propellers are already known in which there is an articulated quadrilateral, the propulsive element being fixed on the coupling link, but at its articulation with the oscillating crank in such a manner that the trajectory of the propulsive element remains always the same. On the contrary, in carrying out the present invention in constructions where the propulsive element is placed on the coupling link between the articulations of an articulated quadrilateral, the trajectory of the element may be modified at the same time as the law of orientation of this element.

In the example diagrammatically indicated in Fig. 3, it will be supposed that the orbital movement is circular and uniform; then, the curve $e\,g\,h$ before mentioned will be a trochoid of a circle: the law of the orientations will consequently consist in causing the normal to the element $a\,b$ to pass through a fixed point of the frame. In fact the hodograph of the movement along the length of $e\,g\,h$ and the hodograph of the orbital movement are identical, to a close translation, proportionate to the speed of entrainment. It results in that, if the hodograph of the orbital movement is mechanically described to a homologous point of the point $a$, the element $a\,b$ will be parallel at each instant to the straight line which joins this homologous point of $a$ to the fixed point of the framework. But the hodograph of the circular uniform movement is a circle and the trajectory and hodograph can be superposed by a rotation of 90°.

The crank J K, rigidly secured on the shaft J, is actuated by the engine. A symmetric profile 1, the section of which through the plane of figure is illustrated, is actuated by the crank pin K, but it is loose on this crank pin. Its direction is given by the condition that a straight line K L, connected to this profile and at right angles to its plane of symmetry, passes through a point L. This point is fixed for a given kind of movement, but its position relatively to J, as well as the orientation of J L relatively to the frame, can be adjusted at will according to the invention.

If the crank J K rotates in the direction of the arrow $f^2$, the profile 1 will orientate itself as if it described the trochoid passing by K and obtained by the rolling without slipping of the circle having a center J and a radius J L on the straight line M N. It will therefore exert on the fluid a thrust in the direction N M and will receive from the fluid a thrust in the direction M N.

It is to be noted that the change of the direction of the thrusts can be obtained without changing the direction of rotation, but by fixing, relatively to the frame, a point $L^1$, symmetrical of L relatively to the shaft J. This result is particularly to be considered because it does not compel to change the direction of rotation of the shaft J for beating backward.

If the apparatus is placed in a fluid stream directed in the direction N M, it will operate as a receiver and the crank J K will rotate in the direction of the arrow.

If it is desired to obtain at the same time a propelling effect and a lifting effect, it will be possible according to the principles already mentioned, to use, instead of a symmetrical profile, a wing profile such as those used in aviation, or to constantly increase the incidence, the straight line K L then forming with the chord of the profile an angle slightly different of 90°, or again to cause J L to rotate about J, so as to move L towards N, or finally to combine these methods.

The condition which consists in causing K L to pass through a fixed point can be realized by any kinematic means already used for that purpose, without the straight line K L being effectively materialized; these orientations can even be controlled by a system of cams and inclines.

In particular, it will be possible to use the device shown in Fig. 4 and constituted by an articulated quadrilateral J K Q S, in which S Q is maintained parallel to J K. In these conditions, the point Q, such that $$\frac{SQ}{JK} = \frac{LS}{LJ}$$

is constantly aligned with K and L.

It then suffices to constrain a section only of K L to pass through Q.

A device permitting the wing surface to move in a conical manner is illustrated in Fig. 5. In this example, the crank 2 (similar to J K) comprises an end trunnion 3, on which the wing 4 can loosely rotate, and which is inclined on the driving axis 5 with which the crank is rigid. The axis of this trunnion 3 describes therefore a conical surface the generatrix X—X of which cooperates with the axis Y—Y of the driving shaft 5.

The guide rod 6 (similar to K L) is connected to the wing 4 by a joint 7 and it slides in a guide 8 preferably connected by a joint 8ᵃ to a trunnion 9 rotating in a bush carried by the frame 10. It will be understood that, in this manner, the orientation of the wing surface 4 is ensured in the manner initially described. It is obvious, on the other hand, that the guiding of the rod might also be ensured in another manner.

The frame 10 must evidently be formed in such a way that the bush in which the axis 9 turns may be displaced at will so as to effect the regulation shown in Fig. 3.

A modification of this guiding system is for instance indicated in Fig. 6. In this example, the guide rod 6 is bent at right angles and pivoted at the top of the right angle on the crank 2; on the other hand, a rod 12 connects the end of the right angle to the wing 4 by means of joints 13 and 14, so as to constitute a parallel motion. The wing 4 is thus always set at right angles to the guide rod.

Another guiding system is illustrated in Fig. 7. In this example, a second crank 16 is rigidly secured on a shaft 15 parallel to the driving shaft 5 and rotating at the same speed. This second crank 16 is displaced 45° relatively to the driving crank 2 and if 1 is the length of this driving crank, the length of the second crank 16 is 1√2. The link 17 connecting these two cranks is pivoted at 18 on the driving crank 2 and can slide in a socket 19 pivoted on the second crank 16. In these conditions, it can be easily verified that the normal drawn at 18 to the link 17 passes through a fixed point M such as M - 5 = 5 - 15. so that if a wing surface is rendered rigid with the link 17 it orientates itself in the same manner as previously described.

A further example diagrammatically illustrated in Fig. 8 and hereinafter fully described, with reference to the constructional illustrations, Figs. 9 to 14, illustrates the use of these various systems of orientation.

In this example, the support of the shaft 90 is always rigid with the link 84 of an articulated quadrangle but not situated on the straight line joining the two joints.

For orientating the wing, a second point 102 will be used to support the wing the movement of which is displaced in phase and position relatively to that of 90. In these conditions, according to the invention the straight line 90, 102 has the orientation provided for.

Instead of displacing backward the entire mechanism of the point 102, it is possible, as illustrated, to use the same joints 81 and 86 and to connect the point 102 to the mechanism by a double parallel motion, as explained hereinafter.

The axis 81 is actuated by the engine and drives the crank shaft having two cranks 83, 82 displaced the one in relation to the other.

The crank 83 actuates the link 84 which is journalled with a lever 85 free to oscillate about 86.

Owing to the dimensions given to these various parts, when the crank shaft describes a full revolution, a point 90, connected to the link 84, describes the curve 109. This curve can continuously transform itself and take the shape 110 when, by the methods which will be indicated, 81 is moved to 81¹ and 86 to 86¹.

The arrangement diagrammatically illustrated in Fig. 8 is constructed as follows:—

On a shaft 81 are fixed two cranks 82 and 83 of the same length. The crank 83 is connected by a connecting link 84 to a crank 85 turning around the axis 86. The crank 82 is connected by a connecting link 87 to a crank 88 turning around the same axis as the crank 85. The connecting link 84 comprises a lateral extension 89 which carries at 90 an articulation for the arm 91 (Fig. 9) which receives the propulsive surface. In the same way the connecting link 87 comprises a lateral extension 92, similar to the extension 89, and carries at 93 an articulation axis, the part played by this member being explained later. The crank 83, connecting link 84 and crank 85 thus form an articulated quadrilateral; the crank 82, connecting link 87 and crank 88 constitute an articulated quadrilateral identical to the foregoing, but the cranks 82 and 83 are displaced the one in relation to the other, it being possible to vary this displacement by certain means which will be explained later. By certain means which will be described hereinafter, the axis 86 may be displaced on the straight line 94.

The axis 86 carries an arm 95 the angular position of which on this axis is alterable at will by any suitable means for the axis 86 does not turn and serves simply to articulate the connecting links 85 and 88. There are many means in existence for varying, at certain times, the angular position of an arm such as 95 on an axis such as 86, and to render the arm 95 immovable in position. Any one of these known means may be employed. The arm 95 carries an articulation 96 for a connecting link 97 articulated on the other hand to an arm 98, which may pivot with the axis of articulation 99 of the connecting link 87 and of the crank 88. The arm 98 and the arm 95 are of the same length, and they constitute, with the connecting link 97 and the crank 88, an articulated parallelogram of such a kind that the arm 98 is always parallel to the arm 95 when the system is working. Another arm $98^1$ is fixed, as is the arm 98, on the same axis 99. The said arm $98^1$ might be omitted the arm 98 being able to take the same part. The arm $98^1$ which is identical with the arm 98—that is to say, of the same length, and secured in the same manner on the axis 99—carries at 100, an articulation for a connecting link 101 which is articulated at 102 on an arm 103 pivoted on the axis 93. The arm 103 is of the same length as the arm $98^1$ and of such a character that it forms, with the said arm $98^1$, the connecting link 101, and the connecting link 87, an articulated parallelogram; in this manner in the course of working the arm 103 is always parallel to the arm $98^1$, which is always parallel to the arm 95, the position of which in space may be regulated as hereinbefore described.

Referring to Fig. 8, it will be seen that the points 93 and 90 describe identical orbital movements but with a certain alteration in phase; it will be seen also that the point 102 describes the same orbital movement as the point 93, but with a translation parallel and equal to the length of the arm 95. Consequently the point 102 describes by connection to the point 90 the same orbital movement, but with a certain alteration of phase, and a certain alteration of its trajectory by translation in relation to the trajectory of the point 90. Consequently a wing surface would be arranged for always passing through the points 102 and 90, as shown for example by the line 104 in Fig. 8, that is to say this rectilinear guide is constantly supported by the roller 106 of the axis 102 and by the knuckle end 90 of the connecting link 84. Moreover the arm 91 is articulated at 107, Fig. 11, at the knuckle end, on the crank chamber casing 108 of the apparatus.

When the position of the point 86 is varied on the straight line 94, by varying at the same time the alteration in phase between the cranks 82 and 83, according to a suitable arrangement, it is possible to pass from the trajectory 109 (Fig. 8) for the points 93 and 90, to the trajectory 110. In addition, by conforming to the characteristic of the invention, it is possible to modify the alteration by translation of the trajectories of the points 90 and 102 by modifying the direction or, in other works, the angular position on the axis 86 of the arm 95. By these means, it is possible, as it has already been described, to effect, for all conditions of flight, an incidence suitable to the wing surface mounted on the arm 91, on its absolute trajectory in the air.

In practice the mounting of the arrangement described is effected as shown in Figs. 10 and 11. The motor shaft 81 is arranged in bearings 111 and 112, secured to arms 113 and 114 which may turn around an axis coinciding with the axis connecting the centres of the two knuckle ends 107, this axis being parallel to the axis of the motor shaft 81. In this manner, the position of the motor shaft 81 in space may be modified. In Fig. 8 the point 81 is shown in its uppermost position but this point may be displaced on the circular trajectory 115 until it attains the low position $81^1$. This displacing movement of the bearings 111 and 112 of the motor shaft takes place by the following means:—The arms 113 and 114, by bearings 116 and 117, are suitably mounted on the crank chamber. One of these bearings is formed with an arm 118 which terminates in a roller 119 engaging in a groove 120 of a nut 121 mounted on a screw 122. This screw is carried in bearings 123 and 124 of the crank chamber 108 and is furnished at its extremity with a bevel pinion 125 gearing with another bevel pinion 126. The pinion 126 is fixed on a screw 127, supported by the bearing 128. The screw 127 engages in a threaded portion arranged in the axis 86, the said axis forming thus the nut of the screw 127. The axis 86 works in guides 129 in such a manner as not to be able to turn.

It will be seen therefore that, by the simple action of the screw 122 there is effected simultaneously the displacement of the motor shaft 81 around the centre 130, and the displacement of the axis 86 along the length of the screw 127. In addition, as has already been described, the cranks 82 and 83, see Figs. 12, 13 and 14, are not secured the one to the other but are capable of relative angular movement. For this purpose the crank 83 comprises a gudgeon 131 on which is mounted a bearing 132 extending from the crank 82. The axis of the gudgeon is in line with the shaft 81. A bevel pinion 133 is keyed at 134 on the crank 83. A bevel pinion 135, of the same diameter as that of the bevel pinion 133, is keyed at 136 on the crank 82. A bevel pinion 137 gears into both the bevel pinions 133 and 135, and the said bevel pinion 137 is rotatably mounted in a ring 138 supported by a bearing 139 of the crank 82 and a bearing 140 of the crank 83. A ring 141 is arranged on the ring 138 and is capable of sliding thereon. This ring 141 is fitted with a finger 142 which engages in a groove 143 cut in the end of the axle of the pinion 137, the said groove being so arranged as not to pass through the axis of the said pinion 137. The ring 141 also carries other fingers 144 and 145 engaging in grooves 146 and 147 formed therefor in the ring 138, the arrangement being such that the ring 141 may slide on the ring 138 but may not turn in relation to it.

It will be understood that the sliding of the ring 141 on the ring 138 produces, by the finger 142, the rotation of the bevel pinion 137. In fact, the finger 142, engaged in the groove 143, forces the bevel pinion 137 to turn when the ring 141 is caused to slide on the ring 138.

The sliding movement of the ring 141 is effected by means of a fork 148, Figs. 10 and 11. The fork is formed in one with an arm the extremity 149 or foot of which works in an arcuate groove 150 having for its centre the point 130. The foot 149 of the fork 148 has a section in the form of a T so as to be retained in the circular guide or groove 150. It will be seen that in this way the fork 148, when the arm 118, and consequently the shaft 81, turns around the point 130, becomes entrained in this rotation around the point 130. It will be observed that the fork cannot pivot around the axis 81 since it is retained by the T formation of the foot 149. As the guide 150 is inclined, as shown in Fig. 11, the displacement of the fork 148, in the guide 150, has the effect of determining a translation of this fork 148, parallel to the axis 81, and consequently of the ring 141. The bevel pinion 137 is consequently partially rotated at an angle corresponding to this translation, and in this way the two cranks 82 and 83 are moved relatively to each other. It is to be noted that when the shaft 81 turns, the bevel pinion 137, which cannot turn when the ring 141 is fixed, acts as a key between the bevel pinions 135 and 133. The bevel pinion 137 cannot turn because the finger 142 is never on its axis owing to the fact that the groove 143 does not pass through the axis of the said pinion.

It is thus seen that operation of the screw 122 effects simultaneously the displacement of the shaft 81 and of the axis 86, as well as the relative alteration of the angle between the cranks 82 and 83. The adjustment of the angular position of the arm 95 may be effected by independent means, or as is preferred by means also controlled by the rotation of the screw 122.

The control of the shaft 81 is effected by the worm wheel 151 and the worm 152 which is driven by the motor, the said worm being always maintained in contact with the worm wheel 151 by any appropriate means, the worm 152 being for example driven by the motor by means comprising a universal articulation.

The orientation can also be realized by using the mechanical description of the hodographs as will be explained with reference to Fig. 15.

It will be assumed that the driving shaft rotates at a uniform speed and that the apparatus receives a uniform speed of translation, or more exactly that these two speeds are in a constant ratio, 0 being the centre of the hodograph. In these conditions, the hodograph of the crank is, with the exception of a rotation of 90°, represented by the circle described by the crank itself about 0.

It is known that the hodograph of the joint $q$ of $k$ with $m$ is then the locus of the point $q^1$ where $k$ encounters the parallel to $m$ drawn through 0. The hodograph of any point participating in the movement of $k$, such as $i$ for instance, is the locus of the point $i^1$, such that the triangle $k^1 q^1 i^1$ is similar to the triangle $k^1 i q$, that is to say such that $i^1 q^1$ is parallel to $i q$.

The straight line $0 \; i^1$ is therefore parallel to the normal to the locus of $i$.

As previous explained, by suitably choosing, the point $0^1$ on the normal to the direction of the driving speed, the straight line $0^1 i^1$ is parallel to the direction which the wing surface must have. It then suffices, either by parallel motions, or by any other means, to associate the direction of the element and the direction of $0^1 i^1$. The position of $0^1$ is determined by the relation $$\frac{V}{00^1} =$$

angular speed of the shaft 0. It is to be noted that the circular movement previously studied corresponds, in case the point $i$ is chosen on the link, to the articulation with the driving crank. (Fig. 4.)

The preceding mechanisms are also applicable when the locus of $q$ is a straight line instead of being the circle having a centre $n$.

However, a particularly simple case is to be considered when the movement of $q$ along its path in space, is approximately sinuous, that is to say when the ratio link crank is high. In fact, the curve $e \, g \, h$, Fig. 1, is then a sinusoid and provided its tangents are but slightly inclined, the law of variation of their orientation is approximately sinusoidal.

The wing surface having a constant angle can then be secured on the link, but it is to be understood that the general methods set forth can be used.

It is possible to apply, in their generality, the fundamental principles of the invention to helical propellers for giving them new properties.

It will be supposed that a lifting propeller, diagrammatically illustrated in elevation in Fig. 16, and in side view in Fig. 17, is to be considered. 72 designates the axis of the propeller and 73 and 74 two generatrices, supposed to be rectilinear, of the helicoid. Two points 75 and 76 of these generatrices, situated at the same distance from the axis 72 play the part of homologous points. In fact, they both describe two equal circles in the direction of the arrow, but the movement of 76 in phase-displaced backward of that of 75 proportionally to the angle of the two generatrices, the circle described by 76 is situated below the circle 75. In these conditions, the propelling stress appears as directed upwardly.

If it is supposed that it is desired to cause to appear, in addition to this lifting stress, a side stress, either for stabilizing the apparatus, or even for producing the propulsion in a direction at right angles to the axis 72, such as 77—72 for instance, it suffices to displace from 72 to 77 the center of the movement of the generatrix 74 (Fig. 18, seen in plan). For example the surface can be decomposed into sections which, on the one hand bear on the generatrix 73 and can rotate about the same and, on the other hand, are constrained to pass through a point of 74.

What I claim as my invention and desire to secure by Letters Patent is:—

1. A turbine wheel working either as a propeller or a motor, comprising a wing, means for imparting to a determined point of the said wing a continuous movement along a closed curve, means for imparting to another point of the wing an identical continuous movement along an identical closed curve, but with a certain difference in phase relatively to the first movement, and means for regulating by translation the distance between the said curves.

2. A turbine wheel as claimed in claim 1, wherein an articulated quadrilateral is provided for supporting the wing comprising two pivots having complete rotation and including a connecting rod to which the wing is fixed between points of articulation thereof, the smallest side of said quadrilateral constituting a motive crank, and means for modifying the length of the fixed side of the articulated quadrilateral.

3. A turbine according to claim 1 in which each wing is arranged to pivot on a motive crank, means for guiding this wing in such a manner that an absolutely straight line rigidly connected to the surface of the wing must be compelled to pass by a predetermined point situated outside the circumference described by the motive crank, means for modifying the position of this point to change the action of the propeller.

4. A turbine according to claim 1, comprising two supports turning around two different parallel axes, one of these supports receiving portions of the surface of the wing guided in the second support.

In testimony whereof I have signed my name to this specification.

LOUIS LAZARE KAHN.